UNITED STATES PATENT OFFICE.

FREDERICK W. WEISSMANN, OF CINCINNATI, OHIO, ASSIGNOR TO THE HILL & GRIFFITH COMPANY, OF CINCINNATI, OHIO, A CORPORATION OF OHIO.

METHOD OF RECOVERING GRAPHITIC CARBON FROM GRAPHITE SCALE.

1,239,992.  Specification of Letters Patent.  Patented Sept. 11, 1917.

No Drawing.  Application filed April 28, 1916. Serial No. 94,262.

*To all whom it may concern:*

Be it known that I, FREDERICK W. WEISSMANN, a citizen of the United States, residing at Cincinnati, in the county of Hamilton and State of Ohio, have invented new and useful Improvements in Methods of Recovering Graphitic Carbon from Graphite Scale, of which the following is a specification.

My invention relates to the separation and recovery of graphitic carbon from the graphite scale which is a by-product of iron and steel manufacture and such treatment of the recovered graphitic carbon as will convert it into merchantable graphite. This by-product is also known as furnace scale. The invention consists in the process and mode of treatment hereinafter set forth and claimed.

Furnace scale is formed either by a wet process or by a dry process. That formed dry may become wet from exposure. It will be obvious that if formed wet or afterward wetted, the raw material must be dried before it can be subjected to the treatment proposed in my process. It will be understood then that if the raw material to be operated upon is dried, the drying herein described will be unnecessary.

In the ordinary operation of cupolas, Bessemer converters, blast furnaces, open hearth and reverberatory furnaces, etc., more or less graphite scale is formed which contains graphitic carbon. This graphite scale is a by-product formed by the sudden chilling and cooling of the molten metal and is regarded as refuse and treated as a waste product. The manufacturers of steel and iron get nothing for this graphite waste but in addition are put to the expense of carting it away.

This furnace scale is a composite formed principally of graphitic carbon, iron in free and combined form and silica. I have discovered that the graphitic constituent of the furnace scale, when separated from associated impurities, approximates in chemical constitution and useful qualities the commercial product known as graphite refined from natural deposits; and that by simple and inexpensive treatment, the said new artificial product may be obtained at so low a cost as to successfully compete with the best natural graphite including the best obtainable as a new and useful form of commercial graphite. The graphite scale thus to be treated varies in the constituent proportion of graphitic carbon ordinarily from about twenty to about forty per cent.; and, as the graphite from natural deposits is used in varying states of purity applied to a wide variety of purposes, so the product to be derived from the treatment of the graphite scale referred to may be likewise used and applied.

Each and all of the steps described herein are for the purpose of eliminating the materials other than graphitic carbon from the graphite scale; hence I conceive as within the scope of my invention the use of one or of any number of the several steps hereinafter described; the last, only, of which—namely: the acid treatment—would be impractical unless used upon material already relieved in great part of everything other than graphitic carbon. Obviously the order of these steps might be changed, but I believe the order given herein preferable.

The graphite scale resulting as a waste product from furnace manipulation as above indicated may be passed through a screen of about $\frac{1}{4}$ inch mesh to take out the larger pieces of iron, slag, etc. If the iron in the scale has oxidized, the scale may be treated with acid to bring the iron into solution; and then the iron may be precipitated with alkali in any customary manner to remove the iron hydrate. I prefer to use caustic potash or soda in the wet state to facilitate the precipitation of the iron under these conditions.

The screened scale, with the iron unoxidized, is treated by some or all of the following methods, and is ordinarily of merchantable purity when the "third" treatment has been concluded.

The method of treatment which I employ is as follows:—

First: The graphite scale is thoroughly dried, preferably in a steam-jacketed rotary drier, and when so dried is passed into an air separator where the graphitic carbon is removed from the heavier particles of other materials. All that is not removed by this step is waste.

Second: The flaky scale removed has considerable iron and silica dust mixed with it. I therefore pass it over a silk or metal bolting cloth, preferably of from 100 to 140 mesh to free it from dust, and the flake is then collected in the usual manner. The dust is waste.

Third: The flaky scale which has been separated out from the other materials by air separation, is subjected to the action of an electro-magnetic separator, by which the greater proportion of the iron is removed, in fact practically all of that which is not so combined with or encrusted upon the flakes themselves as to be integral therewith. That which adheres to the magnet is waste. Care must be used so as not to take up flakes of graphite having iron combined with or encrusted upon them.

Fourth: The graphitic carbon flakes with the iron combined with or encrusted upon them, are reduced to a powder and by levigation the graphitic carbon is separated from the iron and silica. The iron and silica removed are waste.

Fifth: The comminuted graphitic carbon is chemically refined by boiling with sulfuric and nitric acid in proportion of three of the former to one of the latter, preferably; or other acids such as hydrochloric and hydro-fluoric may be used in combination. The residue is then thoroughly washed free of acid and then filtered, pressed and dried. The iron and silica removed by acids are waste.

The product when carried through all these stages is substantially pure graphitic carbon exhibiting many chemical and physical properties similar to those of natural graphite. Natural flake graphite differs from the refined graphitic carbon produced by this process in specific gravity, chemical properties and composition. The specific gravity of natural flake graphite is 2.34 to 2.35; and of this artificial graphite is 2.12 to 2.15. The chemical composition of natural flake graphite and this artificial graphite differs for when both are similarly oxidized, the chemical analysis of the oxidized natural flake graphite is $C_{28}H_{10}O_{15}$; and of this artificial graphite oxidized is $C_{28}H_8O_{12}$.

I claim as my invention and desire to secure by Letters Patent of the United States:

1. The method of obtaining marketable graphitic carbon from the waste product known as graphite scale, consisting in separating and removing the foreign matter by mechanical separative means leaving the graphitic carbon as a residue.

2. The method of obtaining graphite from dry artificial graphite scale, which consists in subjecting the said scale to the action of an air separator.

3. The method of obtaining graphite from dry artificial graphite scale, which consists in subjecting it to the action of an air separator and bolting.

4. The method of obtaining graphite from dry artificial graphite scale, which consists in subjecting the scale to the action of an air separator, bolting and subjecting the residue to the action of an electro-magnetic separator.

5. The method of obtaining graphite from dry artificial graphite scale, which consists in subjecting the scale to the action of an air-separator, bolting, subjecting the residue to the action of an electro-magnetic separator, pulverizing the product thus obtained to powder, separating the graphitic carbon from the other residual substances by levigation, and further refining the product by boiling with an acid solution, washing the graphitic carbon residue and filtering, pressing and drying the same.

6. The method of obtaining graphite from dry artificial graphite scale, which consists in subjecting the scale to the action of an air separator, bolting, subjecting the residue to the action of an electro-magnetic separator, pulverizing the product thus obtained, separating the graphitic carbon from the other residual substances by levigation, and further refining the graphitic carbon by boiling with an acid solution and washing the graphitic carbon residue and drying the same.

7. The method of obtaining graphite from dry artificial graphite scale, which consists in subjecting the scale to the action of an air separator, bolting, subjecting the residual substances to the action of an electro-magnetic separator, reducing the new residuum to powder, and separating the graphitic carbon from the other substances by levigation.

8. The method of obtaining graphite from dry artificial graphite scale which consists in subjecting said scale to the operation of screening and then subjecting the product thus obtained to the action of an air separator.

9. The method of obtaining graphite from dry artificial scale which consists in subjecting it to the operation of screening then subjecting the product thus obtained to the action of an air separator and then subjecting that product to the operation of bolting.

10. The method of obtaining graphite from dry artificial graphite scale which consists in subjecting said scale to the operation of screening then subjecting the product thus obtained to the action of an air separator then subjecting that product to the operation of bolting then subjecting that product to the action of an electro-magnetic separator and then separating the graphitic carbon from the other residual substances by levigation.

11. The method of obtaining graphite from dry artificial graphite scale which consists in subjecting said scale to the operation of screening then subjecting the product thus obtained to the action of an air separator then subjecting that product to the operation of bolting then subjecting that product to the action of an electro-magnetic separator and then separating the graphitic carbon from the other residual substances by levigation and then further refining that product by boiling with an acid solution and washing the graphitic carbon residue and then pressing and drying same.

In testimony whereof I have hereunto set my hand in presence of two subscribing witnesses.

FREDERICK W. WEISSMANN.

Witnesses:
    WALTER A. KNIGHT,
    ALBERT H. LEEHER.